United States Patent [19]

Shatuck

[11] Patent Number: 4,822,488

[45] Date of Patent: Apr. 18, 1989

[54] VACUUM DISCHARGE ASSEMBLY FOR ROTARY DRUM FILTERS

[75] Inventor: Lawrence A. Shatuck, Portland, Oreg.

[73] Assignee: LaValley Industries, Inc., Vancouver, Wash.

[21] Appl. No.: 259,970

[22] Filed: Oct. 19, 1988

[51] Int. Cl.$^4$ .............................................. B01D 33/06
[52] U.S. Cl. .................................... 210/404; 210/429
[58] Field of Search ................ 210/217, 392, 402–404, 210/429, 430, 784; 162/321, 323, 334, 357, 369, 370

[56] References Cited

U.S. PATENT DOCUMENTS

| 4,608,170 | 8/1986 | LaValley | 210/392 |
| 4,608,171 | 8/1986 | LaValley | 210/392 |
| 4,683,059 | 7/1987 | LaValley | 210/392 |

Primary Examiner—Frank Sever
Attorney, Agent, or Firm—Marger & Johnson

[57] ABSTRACT

The subject valve discharge system comprises a discharge valve member that includes a valve closure segment at an inlet end thereof for insertion in the discharge valve housing. It further includes valve connecting means at a discharge end thereof. The respective discharge valve member and the discharge valve housing together define a gap therebetween. The discharge elbow defines a flow passage therethrough and includes elbow inlet and outlet ends. The elbow inlet end includes elbow connecting means. Discharge valve mounting means are connected to the respective discharge valve member and the elbow connecting means, respectively. The valve mounting means is self-adjustable during use for axial movement in response to the axial movement of the discharge system which is responsive to the axial movement of the rotary drum filter. In this way, the gap setting is maintained at a substantially constant, fixed clearance.

20 Claims, 6 Drawing Sheets

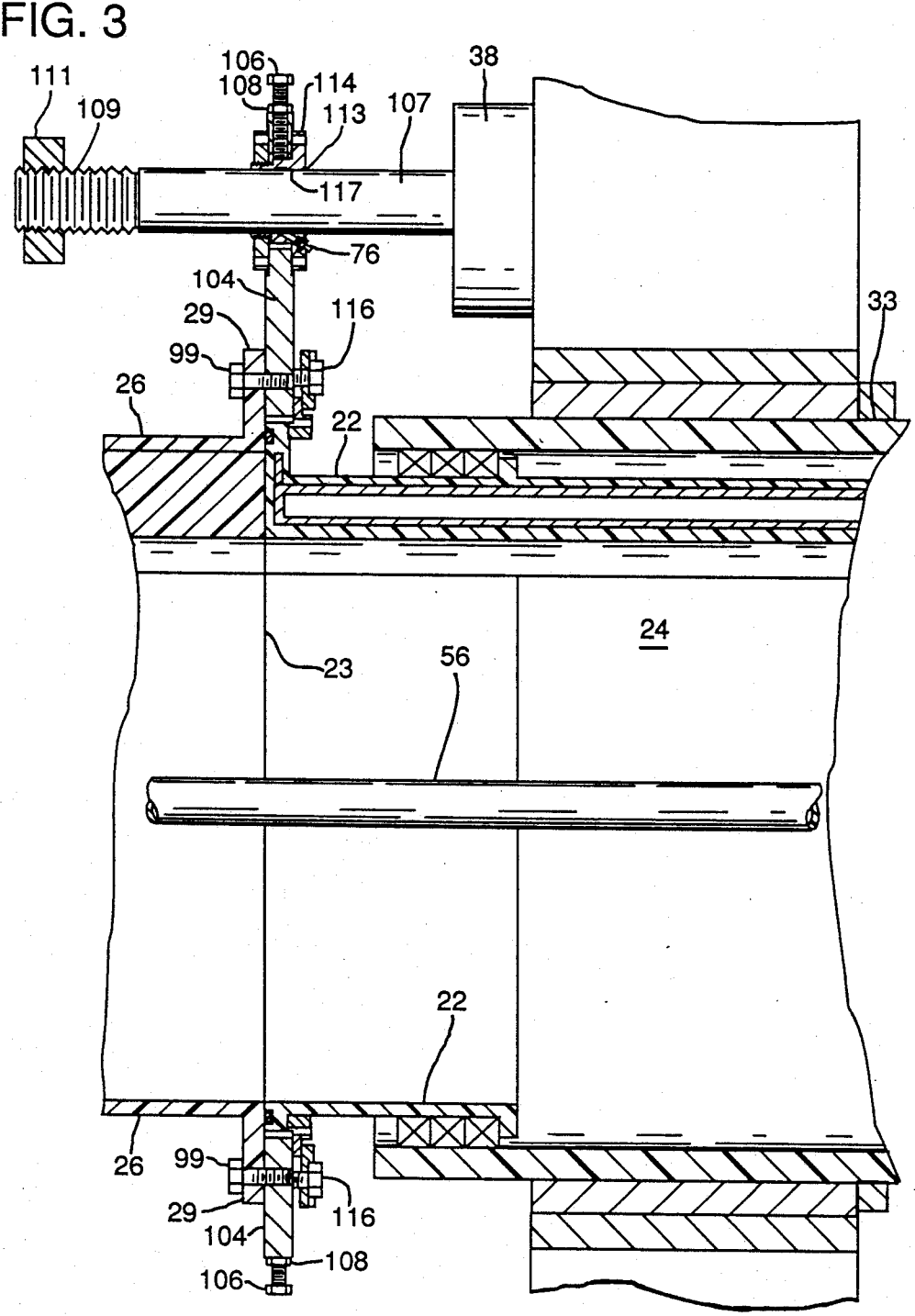

VACUUM DISCHARGE ASSEMBLY FOR ROTARY DRUM FILTERS

BACKGROUND OF THE INVENTION

The present invention relates to rotary drum filters used in the pulp and papermaking industry to form a mat of wood pulp and separate the filtrate from its mat. The invention relates especially to such filters of the type in which there is a discharge assembly, including a discharge valve member, and a corresponding valve housing, which together are located at one end of the drum filter for controlling the application of suction to the filter surface and the drawing of filtrate from the mat and drum. More particularly, the invention relates to a system and method for fixing the clearance or gap formed between the discharge valve member and the valve housing.

A drum filter of the type described above, such as a pipe machine type drum filter, comprises a rotary drum partially submerged in a tank of pulp slurry. Typically, the drum has axially extending filtrate channels spaced about its peripheral surface defined by ribs and covered by a filter screen. The surface filtrate channels communicate with an external source of subatmospheric pressure, or suction, through drainage pipes, an annular valve housing mounted centrally within the discharge end of the drum, a discharge valve member, typically a stationary vacuum breaker valve member, seated within the valve housing and extending therefrom, and a discharge elbow connected to the outlet end of the valve member. The discharge valve member has a valve closure segment which blocks off a section of multiple discharge ports in the valve housing to control the application of subatmospheric pressure to the connected drainage pipes and surface filtrate channels.

As the drum rotates about its axis with suction applied, the screen rotates through the pulp slurry and collects a wet mat or "cake" of fibers from the slurry. Filtrate is drawn from the mat through the screen and filtrate channels into the drainage pipes, and from there through the valve housing and into the discharge valve member and discharge elbow to remove the filtrate from the drum. During rotation of the drum, the stationary valve closure segment cuts off suction to the filtrate channels in a segment of the drum surface, thereby enabling removal of the pulp mat from the screen surface, usually with the aid of a doctor device.

Rotary drum filters of the above-described type having a discharge valve assembly at one end of the drum are shown, for example, in U.S. Pat. No. 3,363,774 to Luthi and U.S. Pat. Nos. 4,383,877, 4,608,170, 4,608,171, and 4,683,059 all to LaValley. The above-cited issued LaValley U.S. patents are assigned to LaValley Industrial Plastics, Inc. the common assignee of this application, and are incorporated herein by reference and made a part hereof.

Typically, the discharge valve member for such a rotary drum filter, such as stationary valve member 22 of LaValley patents U.S. Pat. No. 4,608,170-1, is seated within the valve housing. A conically tapered valve closure segment extends rearwardly from the plug to cover a portion of the valve housing outlet ports to block them from the source of suction. A large central shaft extends rearwardly from the plug and outwardly beyond the discharge end of the drum, connecting with an annular flange and sealing rim at the outlet end of the valve member. Usually, a hollow generally cylindrical drive trunnion or shaft connected to the drum surrounds the shaft portion of the valve member to define a portion of the filtrate discharge passage leading from the drum. The outlet end of the valve member joins an inlet end of the discharge elbow at respective flanges, bolted together. The outlet end of the elbow, in turn, connects to a suction pipe leading to the source of subatmospheric pressure. The drive trunnion is enclosed within a stationary drive housing. The drive housing houses the drum drive means, typically a worm gear drive.

Means can be provided for the user to manually adjust the position of the elbow flange both axially and transversely of the valve member on the drive housing to achieve proper seating of the segment. Such manual adjustment can be manually positioned with both axial and radial adjustment bolts acting between the elbow flange and the drive housing. Proper seating of the valve closure segment is complicated by the fact that the valve member and discharge elbow must be securely bolted together at their flanges when the seating adjustment is made because the elbow flange connects the valve member to the drive housing. However, when the elbow is connected to the valve member, access to the valve housing and segment end of the valve member is extremely limited, making accurate seating difficult and tedious. Seating can only be accomplished through trial and error using a feeler gauge affixed to a long stick inserted through a small inspection port in the discharge valve member.

In U.S. Pat. No. 4,608,170-1, a vacuum breaker valve-discharge elbow assembly for a rotary drum filter of the pipe machine type is mounted onto the drive gear housing for manually adjusting the seating via a separate mounting plate. A valve flange is secured to the mounting plate. The mounting plate is in turn transversely and axially adjusted manually on the gear housing via adjusting bolts to accurately seat the valve within its valve housing in the drum. The discharge elbow is then secured to the mounting plate independently of the valve. The valve can be rotationally manually adjusted on the mounting plate without disturbing the prior axial and transverse adjustment of the plate and valve by providing slotted fastener access holes on the valve flange and close tolerance valve flange guide shoulders on the mounting plate. Cooperative calibration plates on adjacent valve flange and mounting plate surfaces facilitate precise angular manual adjustment of the valve.

Setting and maintaining the properly aligned seating of the discharge valve assembly within the valve housing during use is critical. The gap formed between the discharge valve member and the valve housing must be centered and set at a fixed clearance which is close enough to produce a maximum vacuum level, but spaced apart to prevent damage from occurring during use due to the interaction of the valve member and the valve housing. However, maintaining the gap at a requisite fixed clearance is a particular problem after manually setting gap when for instance, the drum undergoes normal axial expansion and contraction during use. Thus, in certain instances, such as when the discharge valve assembly is located on the non-driven side of the drum, the drum can expand beyond the gap clearance causing severe damage to the discharge valve assembly and resulting in costly production downtime.

Therefore, a need exists for a system and method for readily setting and maintaining during use the gap between the discharge valve member and the valve housing of a rotary drum filter at a fixed clearance.

SUMMARY OF THE INVENTION

The problems described above which are present in the prior art rotary drum filter systems of the type having a discharge valve housing at the discharge end of the rotary drum have been overcome by the valve discharge system of the present invention which is axially self-adjusting during use.

The subject valve discharge system comprises a discharge valve member that includes a valve closure segment at an inlet end thereof for insertion in the discharge valve housing. It further includes valve connecting means at a discharge end thereof. The respective discharge valve member and the discharge valve housing together define a gap therebetween. The discharge elbow defines a flow passage therethrough and includes elbow inlet and outlet ends. The elbow inlet end includes elbow connecting means.

Discharge valve mounting means are connected to the respective discharge valve member and the elbow connecting means, respectively. The valve mounting means is self-adjustable during use for axial movement in response to the axial movement of the discharge system which is responsive to the axial movement of the rotary drum filter. In this way, the gap setting is maintained at a substantially constant, fixed clearance.

A stationary drum support means is typically provided at the discharge end of the drum, the valve mounting means being preferably adjustably connected to the stationary drum support means for the self-adjustable axial movement in response to the axial movement of the drum. The valve mounting means preferably comprises a mounting plate adapter means joined to the stationary drum support means. The mounting plate retainingly engages the mounting plate adapter means for facilitating the above-described self-adjustable axial movement. The mounting plate adapter means of the subject invention can comprise a plurality of studs joined to the support means, the mounting plate including a plurality of apertures for receiving and thereby moveably attaching the plurality of studs to the mounting plate for conducting the self-adjustable axial movement. The mounting plate adapter means can also comprise means for surroundingly retaining and movably engaging said mounting plate for effecting the self-adjustable axial movement.

Means are also provided for joining the discharge system to the rotary drum for maintaining the discharge system in a fixed axial position with respect to the filter drum and thereby fixing the gap clearance. This means for joining the discharge system to the rotary drum is preferably attached at one end to the rotary drum and at the other end to the discharge elbow. This attachment at the discharge elbow provides for ready access to the discharge system-rotary drum joining means. One form of such joining means is a shaft assembly, preferably a thrust shaft assembly.

The discharge system of this invention can also include means for adjustably setting the clearance of the gap. Preferably, these gap setting means are externally accessible for setting the gap clearance to a plurality of predetermined positions without disengaging any one of the discharge valve member, the discharge elbow, and the means for maintaining the elbow in a fixed axial position, respectively, from the discharge system. The means for adjustably setting the gap clearance is preferably included within the means for joining the discharge system to the rotary drum.

The foregoing and other objects, features and advantages of the present invention will become more apparent from the following detailed description which proceeds with reference to the accompanying drawings.

BRIEF DESCRIPTION OF THE DRAWINGS

FIG. 3 is an enlarged, sectional, elevational view of the central portion of the discharge valve assembly of FIG. 1, showing the mounting details of the discharge valve assembly mounting plate-mounting plate adapter, and the connection details of the discharge valve member and the discharge elbow.

DETAILED DESCRIPTION OF A PREFERRED EMBODIMENT

General Arrangement

Figure 1:
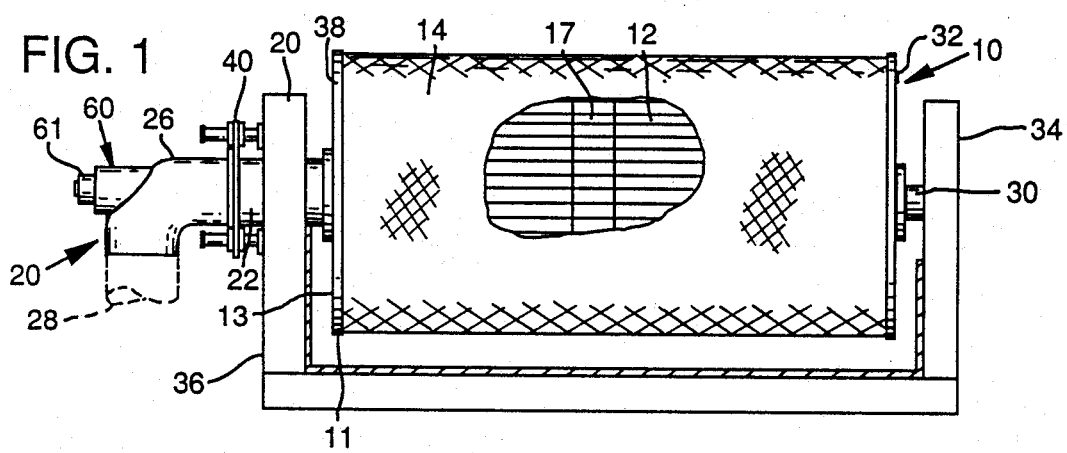
FIG. 1 is a schematic side elevational view of a rotary drum filter including a discharge valve assembly and drive mounting system in accordance with the present invention.
Figure 2:
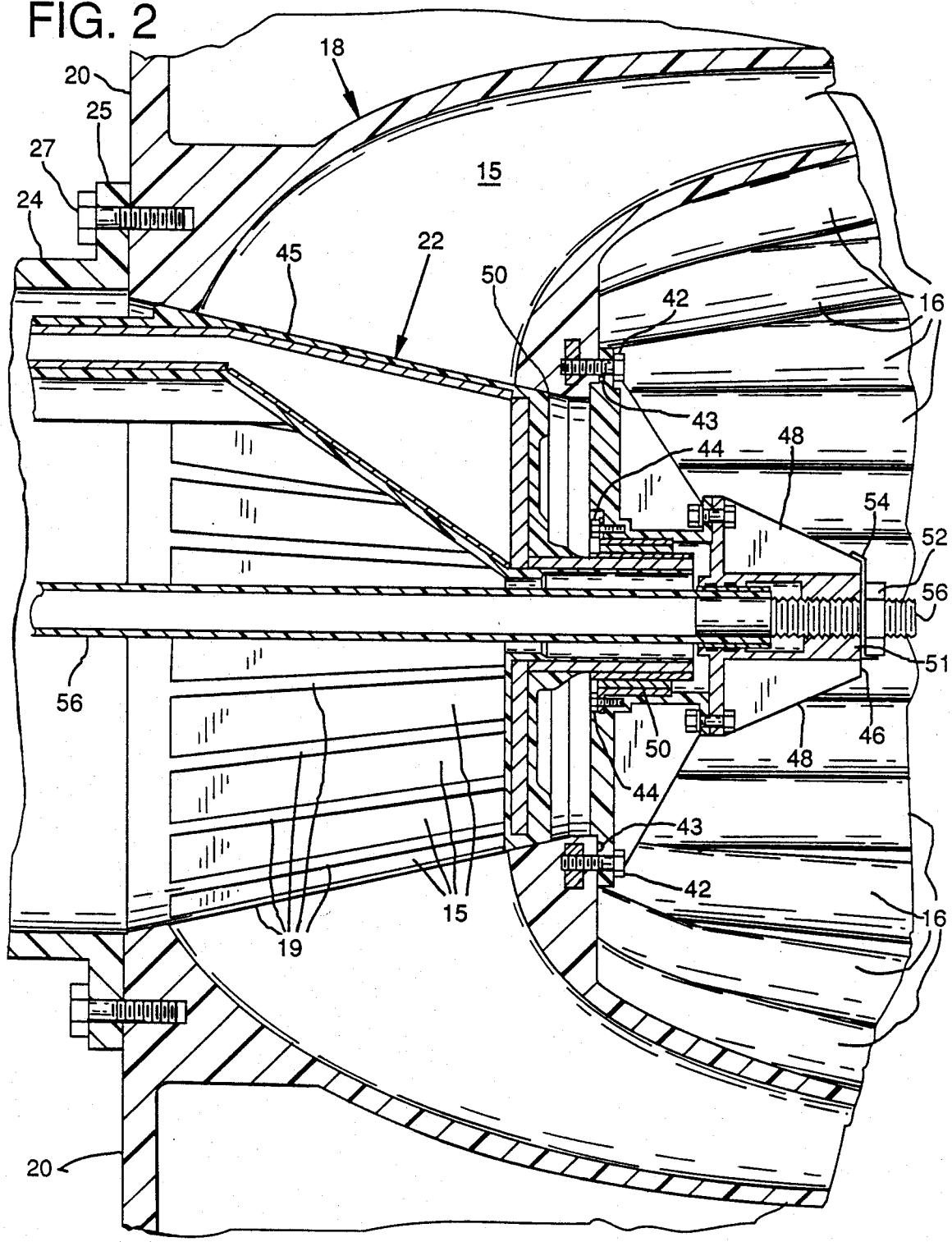
FIG. 2 is an enlarged, sectional, fragmentary, elevational view of the innermost portion of the discharge valve assembly of FIG. 1, showing the connection details of the discharge valve member within the valve housing.

With reference to FIGS. 1 and 2, a rotary drum filter 10 of the pipe machine type includes a cylindrical surface with longitudinally-extending filtrate channels 12, covered with a filter screen 14. The filtrate channels drain into various drainage pipes 16 (see FIG. 2) which lead from intake opening 17 at a central portion of the cylindrical surface to annular valve housing 18 at a discharge end 20 of the filter 10. A stationary valve member 22 extends into the valve housing 18 through a hollow trunnion 24, connected to end 13 of the drum 11. Stationary valve 22, in turn, joins a discharge elbow 26, which is connected at its downstream end to a section pipe 28, leading to a source of subatmospheric pressure (not shown). Hollow trunnion 24 and a drive trunnion 30, at opposite end 32 of the drum, rotatively support the drum for rotation about its axis on stationary drive and drum support pedestal 36. The non-driven trunnion housing, part of the drum support means, serves to support the outlet of the valve member 22 in the inlet end of discharge elbow 26 through an appropriate connection indicated generally at 40. As shown in FIG. 2, annular valve housing 18 is partitioned by ribs 19 radially extending into chambers 15 which communicate with drainage pipe 16 and then define outlet ports for discharging filtrate from drum 11. Filtrate leaves the drum 11 through hollow trunnion 24 and discharge elbow 26. The same elements communicate subatmospheric pressure from the source to the drum surface filtrate channels 12, as permitted by the stationary valve member 22.

Discharge Valve Member

Referring to FIG. 2, discharge valve member 22 comprises a unitary annular valve body including a tapered inlet end portion seated within valve housing 18, and a space annular outlet portion extending within non-driven trunnion 24 and attached thereto via flange portion 25 and bolts 27 to drum 20. A gap 45 is defined between discharge valve member 22 and valve housing 18, respectively, at a fixed clearance, typically of from about 0.015" to 0.025". It is this gap 45 which is readily set and maintained during use by the system of this invention.

The inlet end portion of the valve member 22 includes a rotatable thrust shaft assembly 56 held in an axially fixed position by lock tab 54 and locknut 52 to the inner bearing support portion of filter drum 11. The thrust shaft assembly 56, is attached to the nose section 46 of the inner bearing support and projects forward to an end 51. A conically tapered valve closure segment extends rearwardly from point 50 and is sized and shaped to fit closely within the conical valve housing space defined by the radially inner edges of valve housing ribs 19 to block off a selected segment of the valve chambers 16 defined by such ribs from the source of vacuum.

As shown in FIG. 3, in discharge valve intermediate section 33, the outlet end of valve member 22 is attached to discharge assembly mounting plate 104 by cap screws 116.

The general description of the configuration and operation of discharge valve member 22 within housing 18 has been previously set forth herein and in the above-cited and incorporated LaValley patents.

Discharge Elbow-Mounting Plate

Discharge elbow 26 comprises a continuation of the flow passage defined by the valve body. The discharge elbow includes connecting means at its inlet end in the form of an elbow connecting flange 29. The discharge elbow also includes an outlet end which is normally received within the inlet end of suction tube 28 (see FIG. 1). The elbow curves smoothly from its horizontally-directed inlet end to its vertically-directed outlet end, forming a smoothly-curving flow passage to minimize turbulence and energy loss with the elbow. Preferably, the flow passage at the inlet end of the discharge elbow 26 has generally the same cross section area as the flow passage at the outlet end of the discharge valve member to achieve a gradual transition of the shape and area of the flow passage within the elbow for providing such minimization of turbulences and energy loss.

Figure 4:
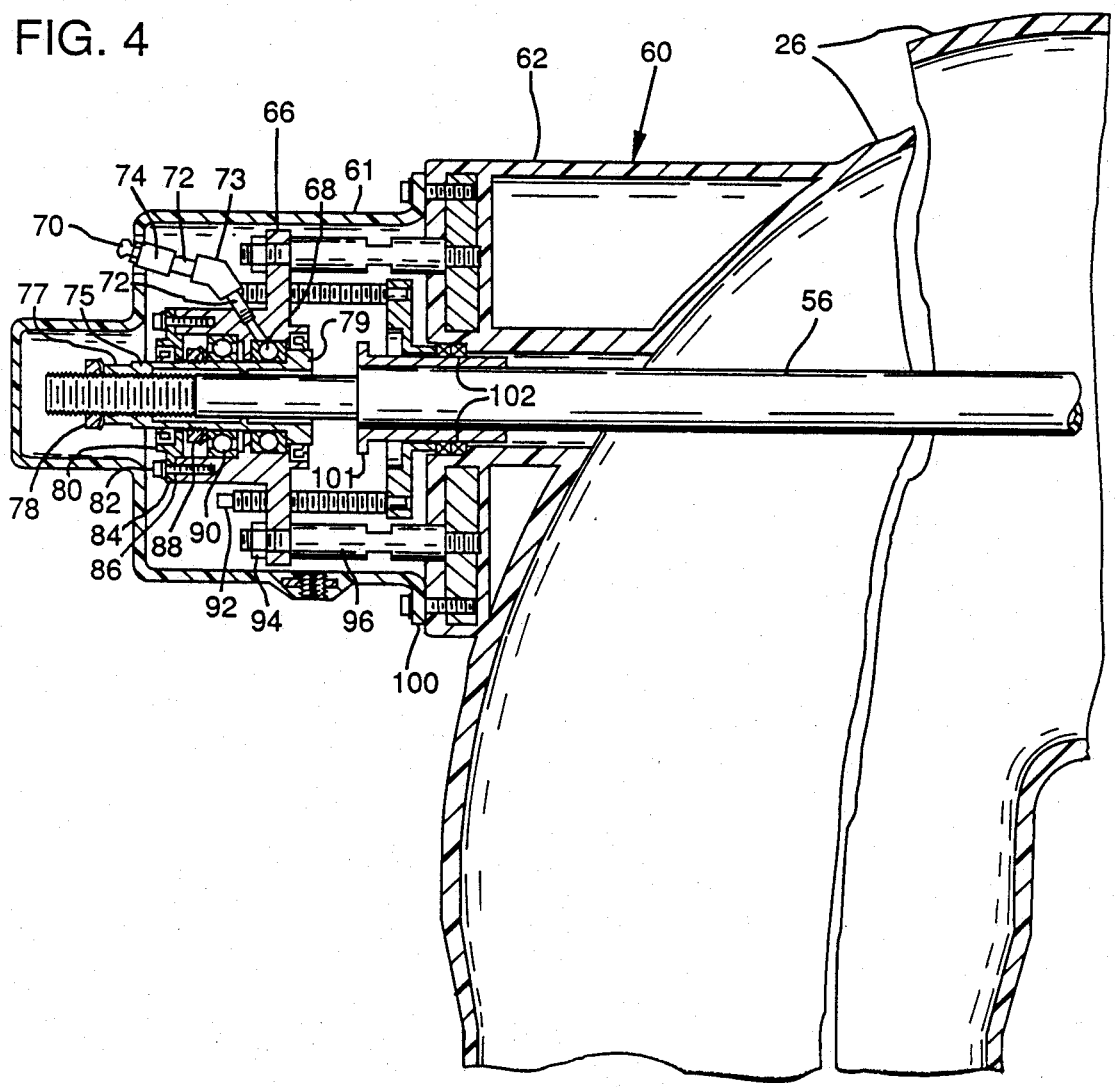
FIG. 4 is an enlarged, sectional, fragmentary, elevational view of the outermost portion of the discharge valve assembly of the drum filter of FIG. 1, showing the adjustment and connection details of the discharge elbow.
Figure 5:
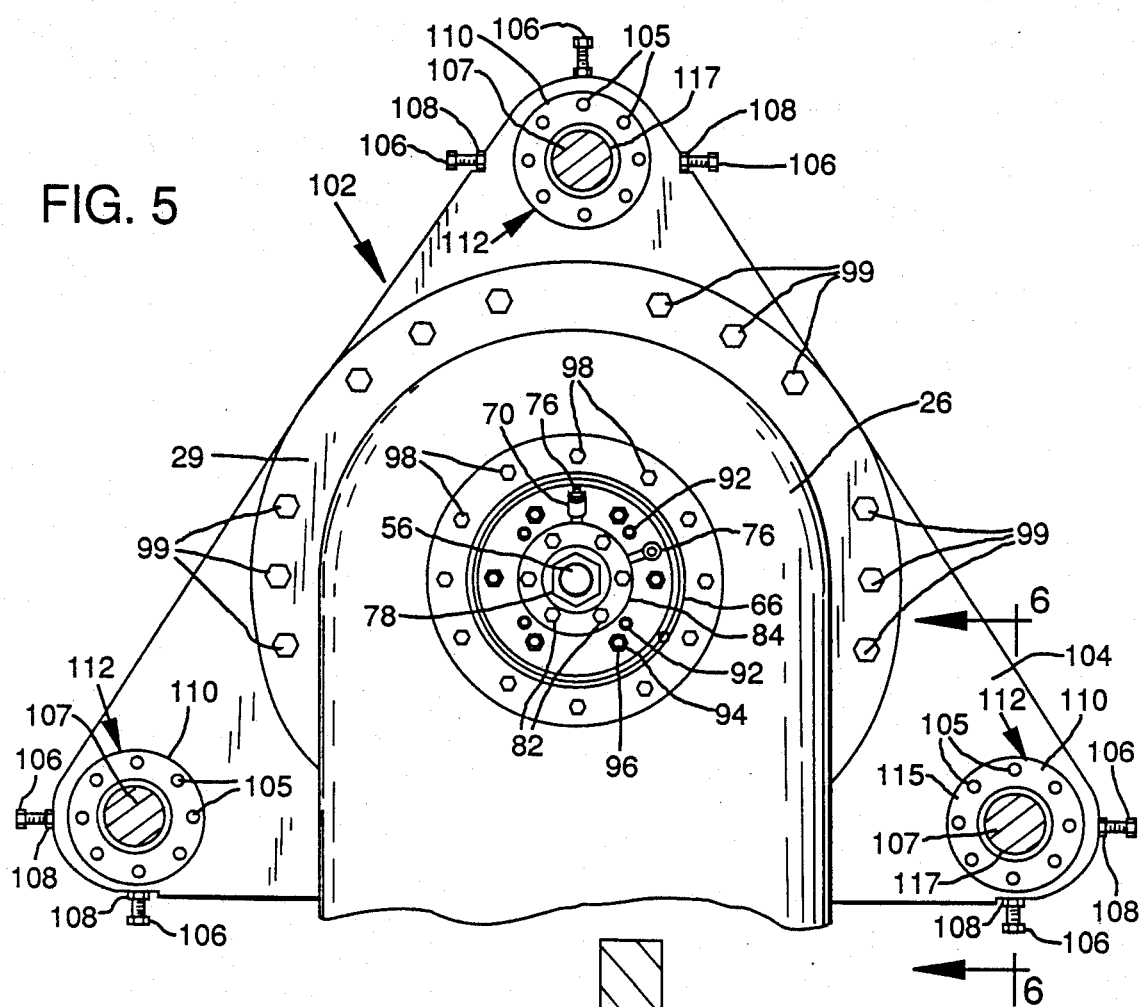
FIG. 5 is an enlarged end view of the discharge valve assembly of FIG. 1, showing the mounting plate-mounting plate adapter, and the discharge elbow connected thereto, a portion of the mounting plate adapter being shown in section.
Figure 6:
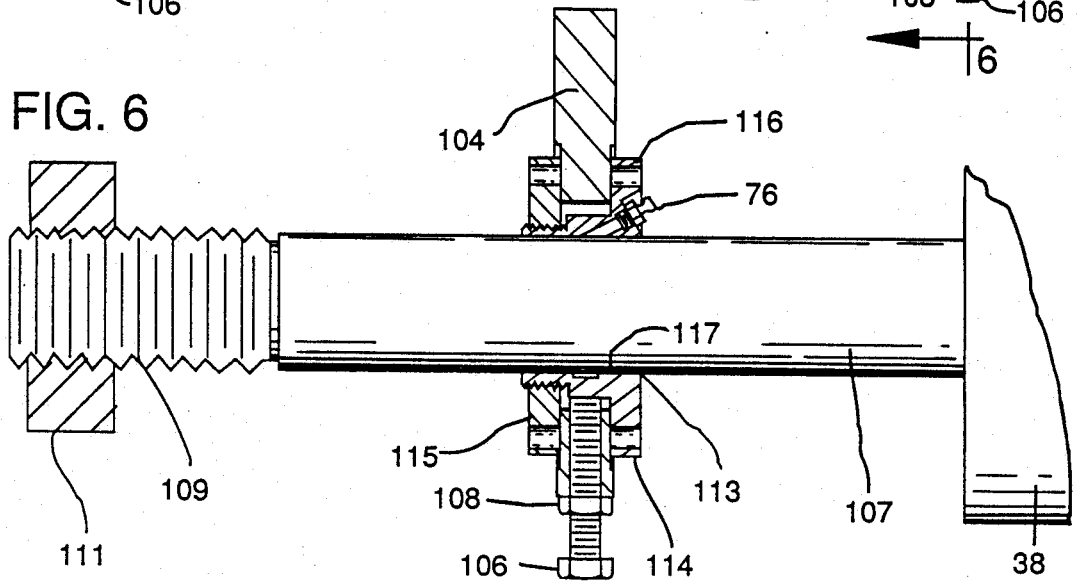
FIG. 6 is an enlarged, fragmentary view, partly broken away, of the mounting plate support assembly as viewed from line 6—6 of FIG. 5.

FIGS. 3-8 depict discharge elbow 26 attached to two different discharge plates and corresponding discharge plate adapters. Elbow 26 is connected to two illustrative discharge plate assemblies for facilitating axial movement thereof, denoted generally as 102 and 120 for facilitating axial movement thereof, respectively, and corresponding discharge plate adapters, generally designated 112 and 122. For example, in discharge assembly 102 of FIGS. 3–6, discharge elbow 26 is connected to discharge mounting plate 104 by a plurality of bolts 99 passing through and engaging annular elbow flange 29. The mounting plate has a central opening which is in communication with the central flow passageway of both the discharge valve member and the discharge elbow, respectively, for facilitating the continuous flow of discharge liquid from the drum filter. Mounting plate 104 is slidably connected to substantially horizontally-extending mounting studs 107 which pass through mounting plate apertures 117 where they are joined at their inner ends to a stationary housing 38. Mounting plate 104 has a substantially triangular configuration with apertures 117 in each of its three respective corners. The studs 107 are maintained in self-adjustable slidable engagement with apertures 117 employing mounting plate support assembly 110. Such sliding engagement is facilitated by lubrication applied to the studs 107 by grease fitting 76. Assembly 110 includes a bushing lock plate 115, including pin wrench holes 105, which is attached to the mounting plate bushing 116 to further limit lateral movement of mounting plate 104. A pair of alignment bolts 106 are connected at substantially right angles one to the other to the end of the mounting plate body for radially aligning the mounting plate 104, and in turn the position of the discharge elbow 26, the thrust shaft assembly 56, and particularly the discharge valve member 22 with respect to valve housing 18. By tightening or loosening the bolts 106 to a desired aligned position, and then locking same in place by tightening hex jam nut 108, the position of discharge valve member within the valve housing can be adjusted. Referring specifically to FIG. 6, mounting stud 107 has a threaded outer end 109. A lock nut 111 is located on the outer end of stud 109. Thus, the mounting plate 104 (and the discharge elbow and discharge valve member connected thereto) can slidably move inwardly or outwardly on the studs 107.

Figure 7:
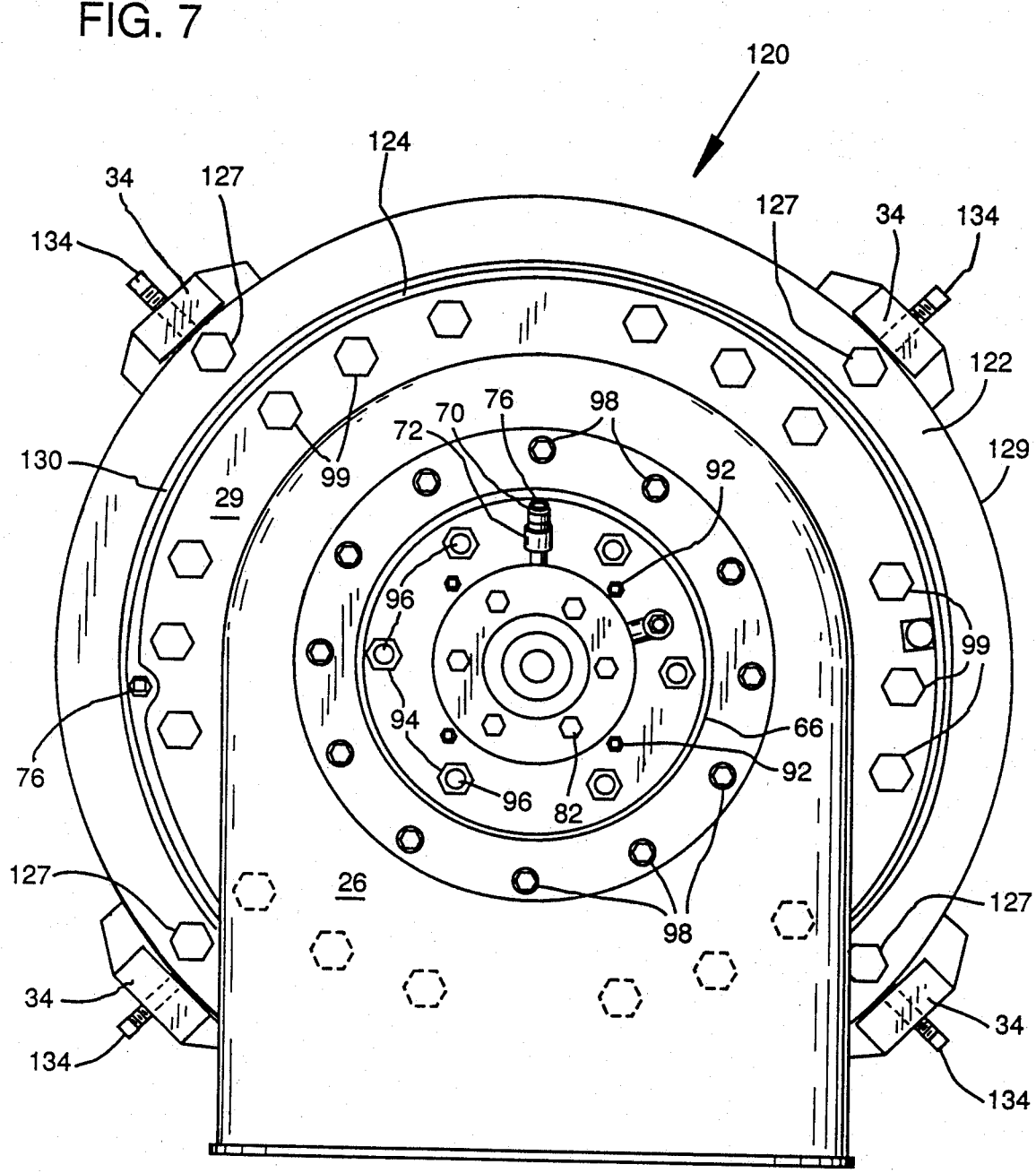
FIG. 7 is an enlarged end view of a discharge valve assembly of the present invention, showing a second mounting plate, a second mounting plate adapter, and the discharge elbow connected thereto.
Figure 8:
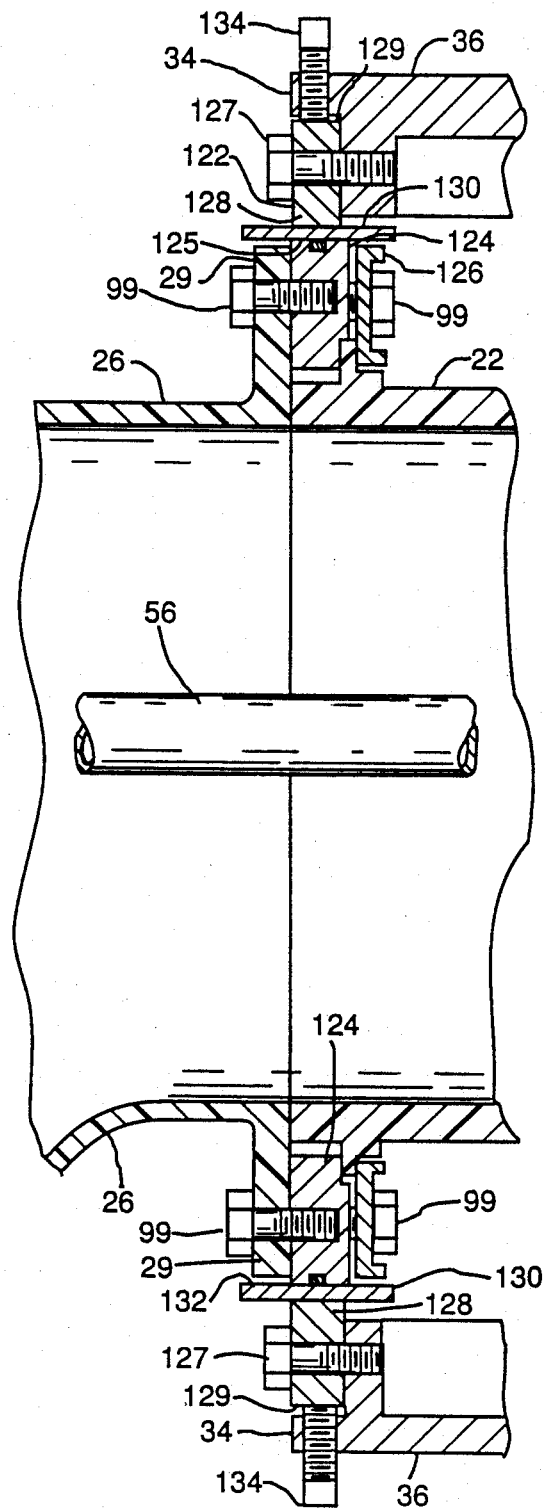
FIG. 8 is an enlarged, sectional, elevational view of the central portion of the discharge valve assembly of FIG. 7, showing the mounting details of the discharge valve assembly mounting plate-mounting plate adapter, and the connection details of the discharge valve member and the discharge elbow.

In a second illustrative embodiment, discharge mounting plate assembly 120 of FIGS. 7 and 8, discharge elbow 26 is connected to annular discharge mounting plate 124 by a plurality of bolts 99. Clamping ring 126 also interlocking engages valve member 22 and mounting plate 124. In this way, all of the individual components of the discharge system are interconnected one to the other. Annular mounting plate adapter 122 is attached in a fixed position to support pedestal 36 by bolts 127. Mounting plate adapter 122 comprises a ring member 128 joined to an annular retaining rim 130. Mounting plate 124 is engagingly connected to annular mounting plate adapter 122 for axial, self-adjustable movement during use in response to the axial movement of the discharge system due to the axial movement of rotary drum filter 10. More specifically, the outer annular edge 125 of mounting plate is retained by, and is in axial sliding engagement with, the outer annular edge 132 of rim 130. The axial width of rim 130 is designed to be greater than the axial width of mounting plate 124. Therefore, when mounting plate 124 is moved axially by the discharge system, annular edge 125 will remain in sliding and retaining engagement with annular edge 132. Such sliding engagement is facilitated by lubrication applied to mounting plate 124 by grease fitting 76.

Support pedestal 36 includes outwardly extending ears 34. Dog point set screws 134 pass through the ears 34 and attach within the peripheral edge 129 of annular mounting plate adapter 122 for radial adjustment of the valve member 22 within housing 18.

Discharge Elbow Connector Assembly

As most clearly seen in FIGS. 4 and 5, discharge elbow connector assembly 60 is provided for directly attaching discharge elbow 26 to drum 11 via thrust shaft assembly 56 so that any inward or outward axial movement of the drum will correspondingly move the discharge elbow in the same axial direction and through the same axial distance. Assembly 60 interior components when in use are protected by a cover 61 which is attached to elbow 26 at discharge elbow flange 62 by bolt assembly 100.

Shaft assembly 56 is threaded at its outer end. A gap adjustment assembly 75 is connected to the shaft assembly 56 at the threaded end for directly setting the clearance of the gap, and comprises an adjustment attachment portion 77, bearing carrier adapter 79 and a lockwasher-nut assembly 78. The gap adjustment assembly, and in turn the shaft assembly 56, is maintained in place by bearing carrier assembly 66, including ball thrust bearing 68 and radial ball bearing 90, seal 80, bolt assembly 82, seal housing 84, gasket 86, and lock-nut assembly 88. It also includes a lubricating assembly including grease fitting 70, nipple 72, elbow connector 73, and coupling 74, all joined one to the other. The bearing carrier is attached to the discharge elbow flange 62 by bearing carrier stud 96-hexnut assembly 94, respectively. Shaft assembly 56 is held in liquid-tight engagement within elbow flange 62 by sleeve 101 and packing material 102.

Axially Self-Adjusting Valve Discharge System

The valve discharge system 20 of the present invention is axially self-adjustable for maintaining a fixed constant clearance of the gap 45 with respect to the axial movement of the filter drum 11. The thrust shaft assembly 56 extends in a axial direction and is attached to drum 11 and discharge elbow 26. Thus, when drum 11 expands, shaft assembly 56 is moved outwardly thereby correspondingly moving discharge elbow 26 through the same axial distance. Since discharge elbow 26 is also connected to mounting plate assembly 104, and since mounting plate assembly 104 is slidably movable on mounting studs 107, plate assembly 104 will be dragged by discharge elbow 26 through the same axial distance as discharge elbow 26 and drum 11, respectively. Similarly, since discharge valve member 22 is also attached to mounting plate 104, discharge valve member 22 will be dragged by mounting plate 104 through the same axial distance as discharge elbow 26, mounting plate 104 and particularly drum 11. Therefore, by employing the self-adjusting discharge valve system of the present invention, discharge valve member 22 will automatically move outwardly through the same distance that drum 11 will outwardly expand, thereby maintaining a gap clearance of a fixed axial size, except that it will be transposed axially to the extent that the drum expands.

The extent of the gap can be preset without disconnecting any of the components of the discharge valve assembly 20. Thus, even though the valve discharge member, the mounting plate, and the discharge elbow are intact as a single unit, the gap clearance can be set to a given predetermined level. More specifically, a user can set the gap clearance as follows: First, cover 61 is removed from discharge elbow flange 62 by first removing discharge elbow bolt assembly 100. The inspection port on the valve discharge assembly is then opened and the gap clearance is measured. Lock-nut assembly 78 is then removed from shaft 56. A wrench or the like is then locked onto adjustment attachment means 77 of bearing carrier adapter 79, and is turned on the threaded end of shaft 56 axially moving the bearing carrier assembly 66 on the shaft. This axially moves the discharge elbow and the mounting plate assembly attached thereto, and ultimately axially moves discharge valve member relative to the valve housing to increase or decrease the gap clearance and move same to the requisite preset position. The gap is again measured. This procedure is repeated until the requisite gap clearance level is reached. The lockwasher-nut assembly 78 is replaced, affixing the bearing carrier adaptor 79 axially to the shaft 56.

Having illustrated and described the principles of my invention by what is presently a preferred embodiment thereof, it should be apparent to persons skilled in the art that such embodiment may be modified in arrangemnt and detail without departing from such principles. I claim as my invention such embodiment and all such modifications coming within the true spirit and scope of the following claims, and all equivalents thereof:

1. In a rotary drum filter system of the type having a discharge valve housing at the discharge end of the rotary drum, an axially self-adjusting discharge system which comprises:
   a discharge system including a discharge valve member, a discharge elbow, and a discharge valve mounting means, respectively, said discharge valve member and said discharge valve housing together defining a gap therebetween; and
   means joining said discharge system to said filter drum for maintaining said discharge system in a fixed axial position with respect to said filter drum and thereby fixing the clearance of said gap;
   said discharge valve member including a valve closure segment at an inlet end thereof for insertion in said discharge valve housing, and further including valve connecting means at a discharge end thereof;
   said discharge elbow defining a flow passage therethrough and including elbow inlet and outlet ends, said elbow inlet end including elbow connecting means; and
   said discharge valve mounting means connected to said respective discharge valve member and said elbow connecting means, respectively, said valve mounting means being self-adjustable during use for axial movement in response to the axial movement of said discharge system due to the axial movement of said rotary drum filter, comprising means for maintaining said gap clearance during use at a substantially fixed, constant size.

2. The system of claim 1, which further includes stationary support means, said valve mounting means being adjustably connected to said stationary support means for said self-adjustable axial movement.

3. The system of claim 1, wherein said valve mounting means comprises mounting plate adapter means joined to said stationary support means, and a mounting plate engaging said connector means for providing said self-adjustable axial movement.

4. The system of claim 1, wherein said mounting plate adapter means comprises a plurality of studs, and said mounting plate including a plurality of apertures for receiving and movably engaging said plurality of studs and said mounting plate for effecting said self-adjustable axial movement.

5. The system of claim 1, wherein said mounting plate adapter means comprises means for surroundingly retaining and movably engaging said mounting plate for effecting the self-adjustable axial movement.

6. The system of claim 1, which further includes means for adjustably setting said gap clearance.

7. The system of claim 6, wherein said gap setting means are externally accessible for setting said gap to a plurality of predetermined positions without disengaging any one of said discharge valve member, said discharge elbow, and said means for maintaining said elbow in a fixed axial position, respectively, from said discharge system.

8. The system of claim 1 wherein said means for maintaining said discharge system in a fixed axial position further includes means for setting said gap clearance to a plurality of predetermined positions.

9. The system of claim 1, wherein said means for maintaining said discharge system in fixed axial position and said gap setting means, respectively, are connected to said discharge elbow.

10. The system of claim 9, wherein said means for maintaining said discharge system in a fixed axial position comprises a shaft assembly.

11. The system of claim 1, wherein said connector means comprises a shaft assembly.

12. In a process; comprising: providing a rotary drum filter of the type having a discharge valve housing at the discharge end of the rotary drum and a discharge system including a valve member inserted within said discharge valve housing, said respective discharge valve member and said valve housing together defining a gap therebetween, maintaining the clearance of said gap at a substantially fixed, constant size, self-adjustingly moving said discharge system in an axial direction during use in response to the axial movement of said rotary drum, and maintaining said substantially fixed, constant size gap clearance.

13. The method of claim 12, which includes the steps of roviding a stationary support means, and adjustably connecting said mounting plate to said stationary support means for effecting said responsive axial movement.

14. The method of claim 12, which includes the steps of providing a mounting plate in said discharge system, and self-adjustingly moving said mounting plate in an axial direction during use in response to the axial movement of said rotary drum.

15. The method of claim 14 which includes the steps of providing a mounting plate adapter means, and movably engaging said studs within said apertures for effecting said responsive self-adjustable axial movement.

16. The method of claim 12, which includes the steps of providing a means for surroundingly retaining and movably engaging said stationary support means, and self-adjustingly moving said mounting plate in an axial direction during use in response to the axial movement of said rotary drum.

17. In a method comprising: providing a rotary drum filter of the type having an discharge valve housing at the discharge end of the rotary drum and a discharge system including a valve member inserted within said discharge valve housing, said respective discharge valve member and said valve housing together defining a gap therebetween, presetting and maintaining the clearance of said gap at a substantially fixed, constant size, presetting said gap to a predetermined clearance, and self-adjustingly moving said discharge system in an axial direction during use in response to the axial movement of said rotary drum thereby maintaining said substantially fixed, constant size gap clearance.

18. The method of claim 17, which further includes the step of joining said discharge system to said rotary drum for effecting said responsive axial movement, and providing means for presetting said gap within said means for joining said discharge system to said rotary drum.

19. The method of claim 18, which further includes the step of providing means for joining said discharge system to said rotary drum comprising a shaft assembly, and attaching one end of said shaft assembly to said rotary drum and the other end of said shaft assembly to said discharge elbow.

20. The method of claim 19, which further includes the step of providing said means for presetting said gap clearance at the exterior of said discharge elbow for ready access by a user in conducting said gap clearance presetting operations.

* * * * *